(12) United States Patent
Roth

(10) Patent No.: US 7,157,042 B2
(45) Date of Patent: Jan. 2, 2007

(54) DROSS COMPRESSION APPARATUS INCLUDING A COOLING SYSTEM FOR COOLING THE COMPRESSION HEAD AND COOLING METHOD

(75) Inventor: David J. Roth, Downingtown, PA (US)

(73) Assignee: Altek-MDY, L.L.C., Cleveland, OH (US)

( * ) Notice: Subject to any disclaimer, the term of this patent is extended or adjusted under 35 U.S.C. 154(b) by 350 days.

(21) Appl. No.: 10/778,456

(22) Filed: Feb. 13, 2004

(65) Prior Publication Data

US 2005/0098930 A1   May 12, 2005

Related U.S. Application Data

(60) Provisional application No. 60/518,547, filed on Nov. 7, 2003.

(51) Int. Cl.
   *C22B 7/04*   (2006.01)
   *C21B 3/04*   (2006.01)

(52) U.S. Cl. ..................... 266/205; 266/227

(58) Field of Classification Search ............... 266/205, 266/227; 75/585, 672
   See application file for complete search history.

(56) References Cited

U.S. PATENT DOCUMENTS

| | | |
|---|---|---|
| 4,386,956 A | 6/1983 | Roth et al. |
| 4,527,779 A | 7/1985 | Roth et al. |
| 5,397,104 A | 3/1995 | Roth |
| 5,669,957 A | 9/1997 | Roth |
| 5,788,918 A | 8/1998 | Bramley |
| 5,811,056 A | 9/1998 | Bramley |
| 6,096,260 A | 8/2000 | Schirk |
| 6,136,263 A * | 10/2000 | Bramley ..................... 266/205 |
| 6,228,319 B1 | 5/2001 | Roth et al. |

* cited by examiner

*Primary Examiner*—Scott Kastler
(74) *Attorney, Agent, or Firm*—Renner, Otto, Boisselle & Sklar, LLP

(57) ABSTRACT

A dross compression apparatus and method includes one or more air nozzles for directing cooling air across the top of a compression head for cooling the compression head. The air may be vented through air vents in a wall of the apparatus after passing across the top of the compression head. Also a plurality of ribs may extend across the top of the compression head in the direction of the air vents in the wall of the apparatus for directing the air across the top of the compression head and out the air vents.

18 Claims, 4 Drawing Sheets

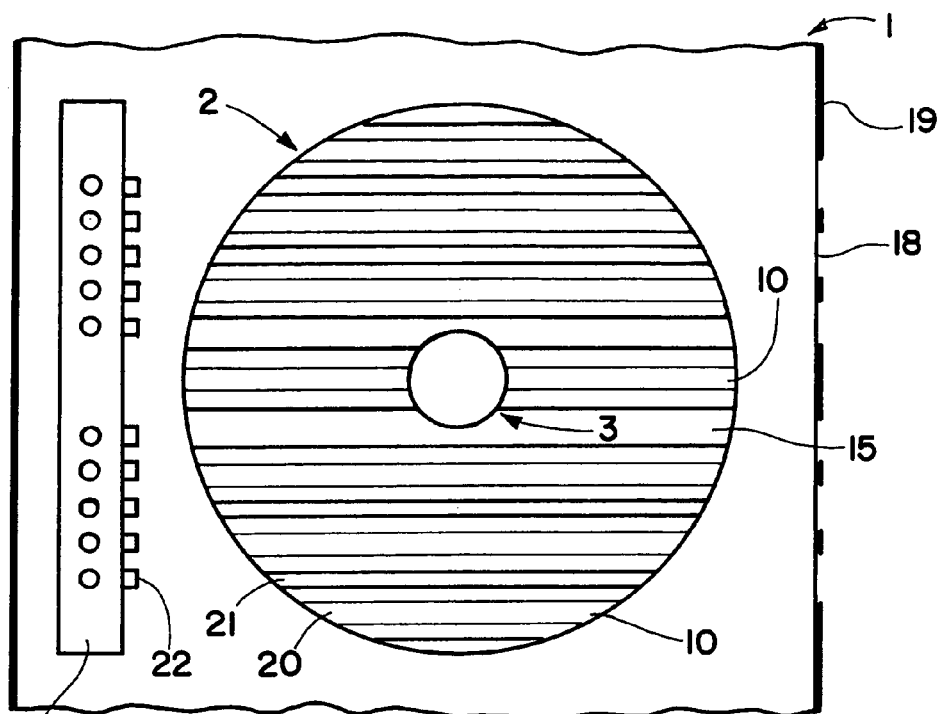
FIG. 3
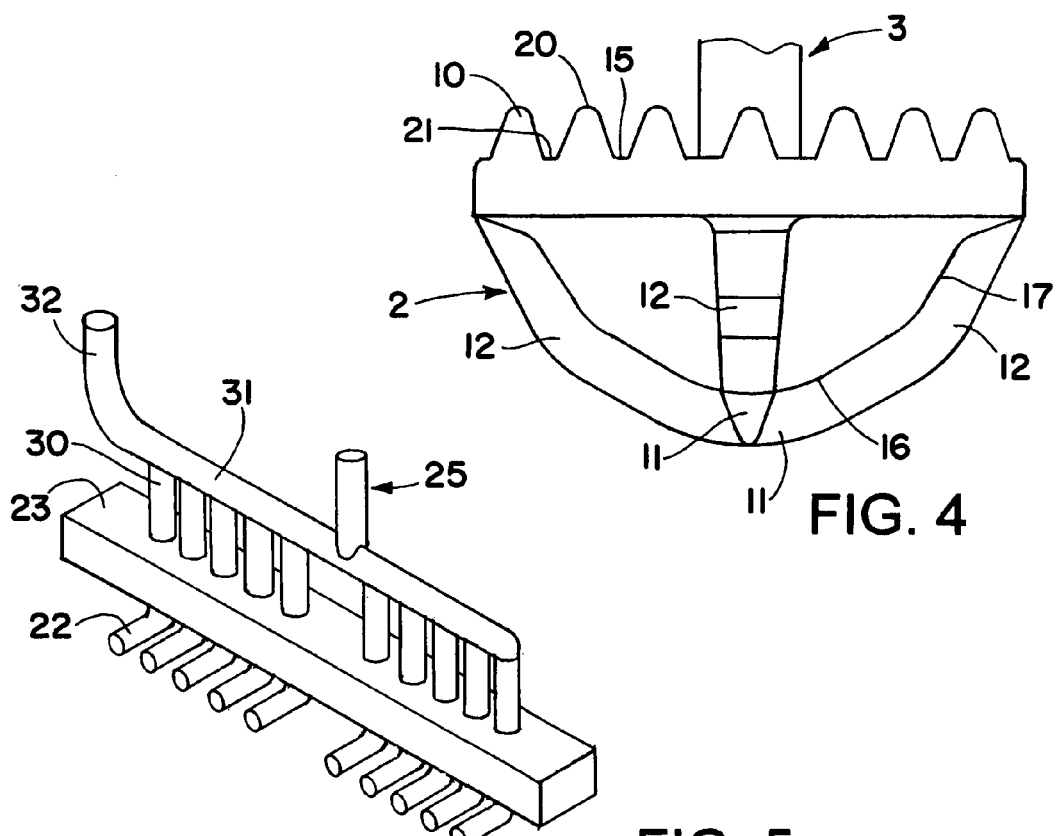
FIG. 4
FIG. 5

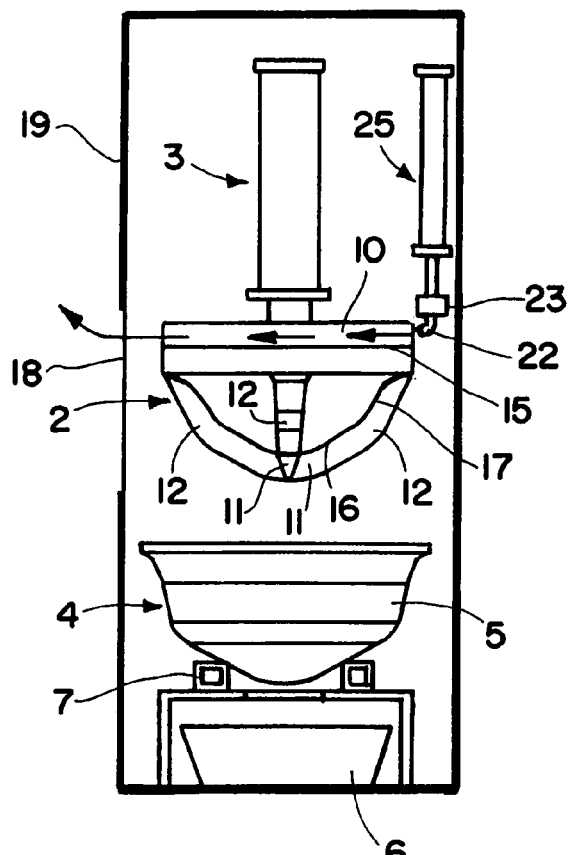
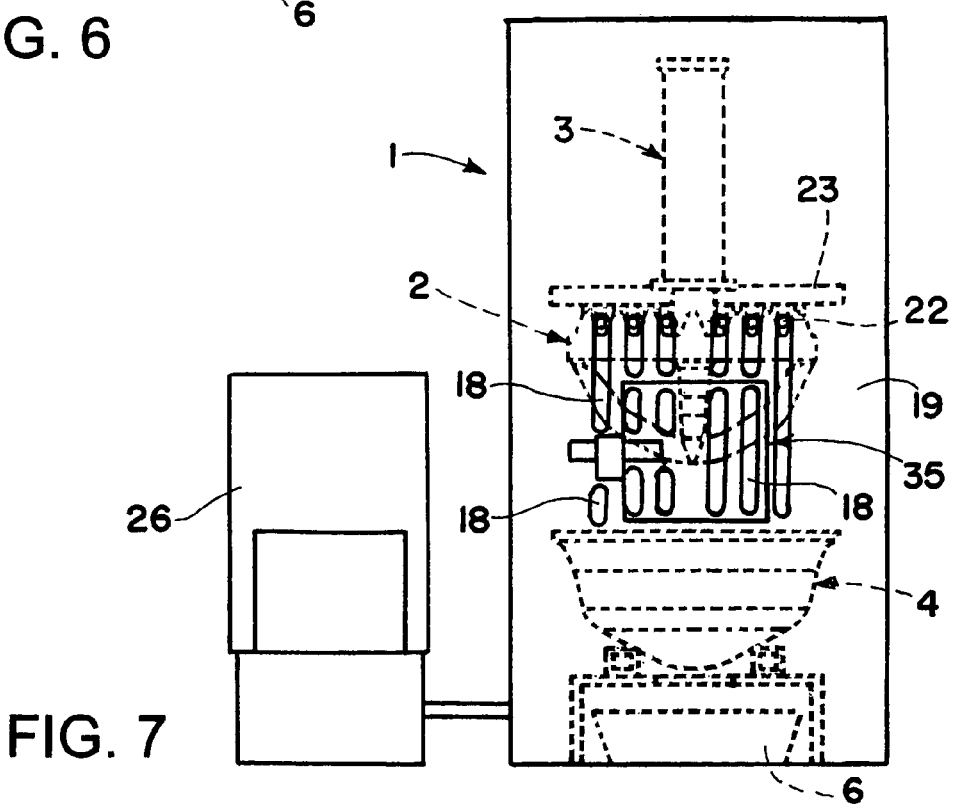

US 7,157,042 B2

DROSS COMPRESSION APPARATUS INCLUDING A COOLING SYSTEM FOR COOLING THE COMPRESSION HEAD AND COOLING METHOD

CROSS-REFERENCE TO RELATED APPLICATIONS

This application claims the benefit of U.S. Provisional Application Ser. No. 60/518,547, filed Nov. 7, 2003.

FIELD OF THE INVENTION

This invention relates to a dross compression apparatus and more particularly to a cooling system and cooling method for more effectively cooling the compression head of a dross compression apparatus.

BACKGROUND OF THE INVENTION

Dross compression apparatus are commonly used to recover non-ferrous metals, particularly aluminum, from dross which has been skimmed from a furnace. Aluminum dross is a combination of aluminum metal and aluminum oxides, as well as other possible components such as various oxides, nitrates and carbides. Aluminum dross is a by-product of an aluminum melting operation. Generally the dross floats on top of the molten aluminum metal in the furnace. Aluminum dross may contain anywhere from ten percent to ninety percent aluminum depending on the particular processing technique and the type of furnace. Therefore the dross in an aluminum melting operation includes a significant amount of aluminum metal which is considered a valuable resource to be recovered.

The recovery of aluminum from aluminum dross must also address the problem of the loss of aluminum metal in the dross due to thermiting or thermite reaction, i.e., exothermic oxidation of aluminum metal. It is generally known to provide the compression head of the dross compression apparatus with air or water cooling to reduce the thermiting action and thereby increase the amount of aluminum recovered from the aluminum dross. However, there is a continuing need to be able to remove heat more effectively from the dross compression head to increase the capacity of the dross compression apparatus in recovering aluminum from aluminum dross or other non-ferrous metals from other drosses without the use of water cooling.

SUMMARY OF THE INVENTION

The compression head of the dross compression apparatus is more effectively cooled in accordance with the present invention by blowing cooling air across the top of the compression head during the recovery of various non-ferrous metals including aluminum from various types of dross.

In accordance with one aspect of the invention, one or more air nozzles are provided for directing cooling air across the top of the compression head.

In accordance with another aspect of the invention, one or more air vents are provided in the dross compression apparatus for venting the air after being directed across the top of the compression head.

In accordance with another aspect of the invention, a plurality of ribs may extend across the top of the compression head in the direction of the air vents for directing the air out of the air vents after being directed across the top of the compression head.

In accordance with another aspect of the invention, the air nozzles may direct air along and between the ribs on the top of the compression head toward the air vents.

In accordance with another aspect of the invention, the air nozzles may be movable in synchronism with the compression head during vertical movement of the compression head toward and away from the dross collector.

These and other objects, advantages, features and aspects of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

In the annexed drawings:

FIG. 3 is a schematic top plan view of the compression head and air manifold with air nozzles connected thereto of FIG. 2.

FIG. 4 is a front elevation view of the compression head of FIGS. 2 and 3.

FIG. 5 is an enlarged schematic perspective view of the air manifold and air nozzles of FIGS. 2 and 3.

FIG. 6 is a schematic side elevation view of one form of dross compression apparatus of the present invention.

FIG. 7 is a schematic back elevation view of the dross compression apparatus of FIG. 6.

DETAILED DESCRIPTION OF THE INVENTION

Figure 1:
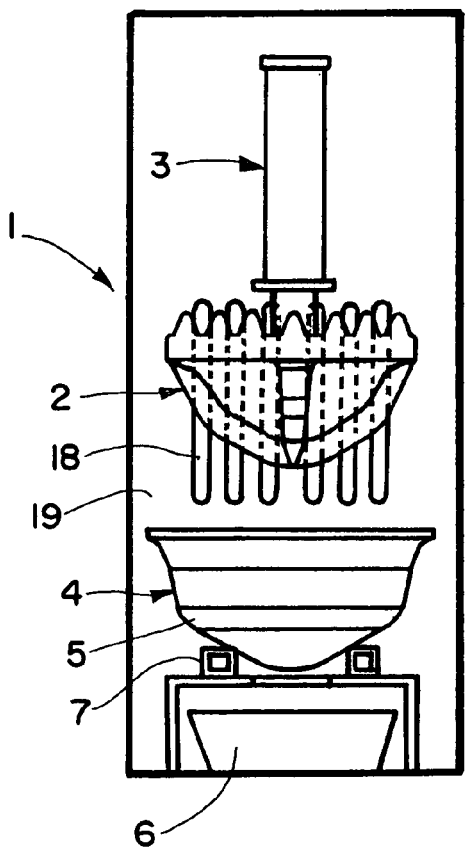
FIG. 1 is a schematic front elevation view of the dross compression apparatus of the present invention showing air vent slots in a back wall of the apparatus.

Referring now in detail to the drawings wherein like reference numerals are used to indicate like parts, and initially to FIG. 1, there is schematically shown one form of dross compression apparatus 1 in accordance with the present invention which may be generally of the type disclosed in U.S. Pat. Nos. 5,397,104 and 5,669,957, the entire disclosures of which are incorporated herein by reference. Such apparatus includes a compression head 2 that may be driven vertically by a suitable drive means such as a fluid piston/cylinder 3 toward and away from a dross collector 4. Alternatively, the drive means may drive the dross collector 4 toward and away from the compression head 2 or drive both the compression head and dross collector toward and away from one another. Any suitable drive means may be utilized for this purpose including hydraulic, pneumatic, electrical or other drive means.

Dross collector 4 may have a substantially hemispheric shaped receptacle 5 and compression head 2 may be similarly shaped to cooperate with the receptacle. The term substantially hemispheric shaped as used herein is broadly defined to mean any shape that is substantially similar in concept and function to the shapes shown in the drawings and includes shapes that deviate from the shapes shown such as flatter structures or more pointed structures as well as structures that may have additional curved surfaces.

The dross collector receptacle 5 is provided with one or more openings (not shown) at the bottom of the receptacle to allow molten aluminum (or other molten metal) to pass by gravity and under the pressure of compression head 2 out from the collector into a lower receptacle 6 which is referred to in the art as a sow mold. Dross collector 4 may be provided with tubular members 7 for receipt of the forks of a forklift truck for transporting the dross collector 4 from a furnace to the dross compression apparatus and removal therefrom.

Figure 2:
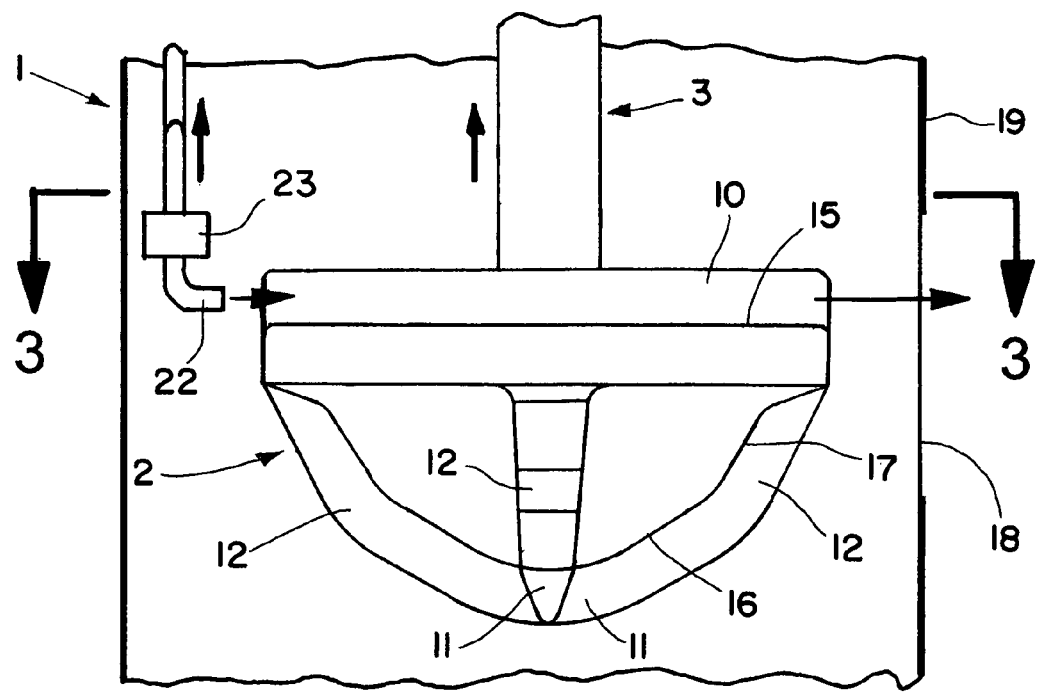
FIG. 2 is a schematic fragmentary side elevation view of the dross compression apparatus of FIG. 1 showing air nozzles connected to an air manifold for blowing air across cooling ribs on the top of the compression head and out air vent slots in a wall of the apparatus.

The compression head 2 of the present invention may be made of any suitable solid metal such as cast alloy steel to provide sufficient mass for dissipating heat in the dross metal during the recovery of various non-ferrous metals from various types of dross, including particularly aluminum from dross which has been skimmed from a furnace. Multiple ribs 10–12 may be provided on the top 15, bottom 16 and sides 17 of the compression head as schematically shown in FIGS. 2–4. As used herein, the term rib means broadly any projection or shape which forms a projection, raised area, ridge, corner or non-continuity on the compression head.

The ribs 11 and 12 on the bottom 16 and sides 17 of compression head 2 extend into the dross in the dross collector or skim box 4 during the recovery process to help dissipate the heat in the dross metal. Also such ribs may help increase the compressive force on the dross metal as disclosed in the aforementioned U.S. Pat. Nos. 5,397,104 and 5,669,957.

The ribs 10 on the top 15 of compression head 2 also help to remove heat from the compression head. To remove heat more effectively from the compression head, cooling air may be blown across the top of the compression head during and between relative vertical movements of the compression head and dross collector toward and away from each other. These ribs 10 extend generally in the same direction, for example, from the front of the apparatus toward the back, to help channel cooling air that is blown across the top of compression head 2 out through air vent slots 18 (see FIGS. 1–3 and 7) in a wall 19 of the dross compression apparatus.

Cooling air may be directed along the peaks 20 and valleys 21 of ribs 10 by a plurality of vortex nozzles 22 supported by an air manifold 23. If the compression head is mounted for vertical movement, the air manifold 23 and associated air nozzles 22 may be raised and lowered in synchronism with the raising and lowering of the compression head 2 so that the air is always directed across the top of the compression head and not onto the dross metal which would cause the dross metal to oxidize.

Figure 8:
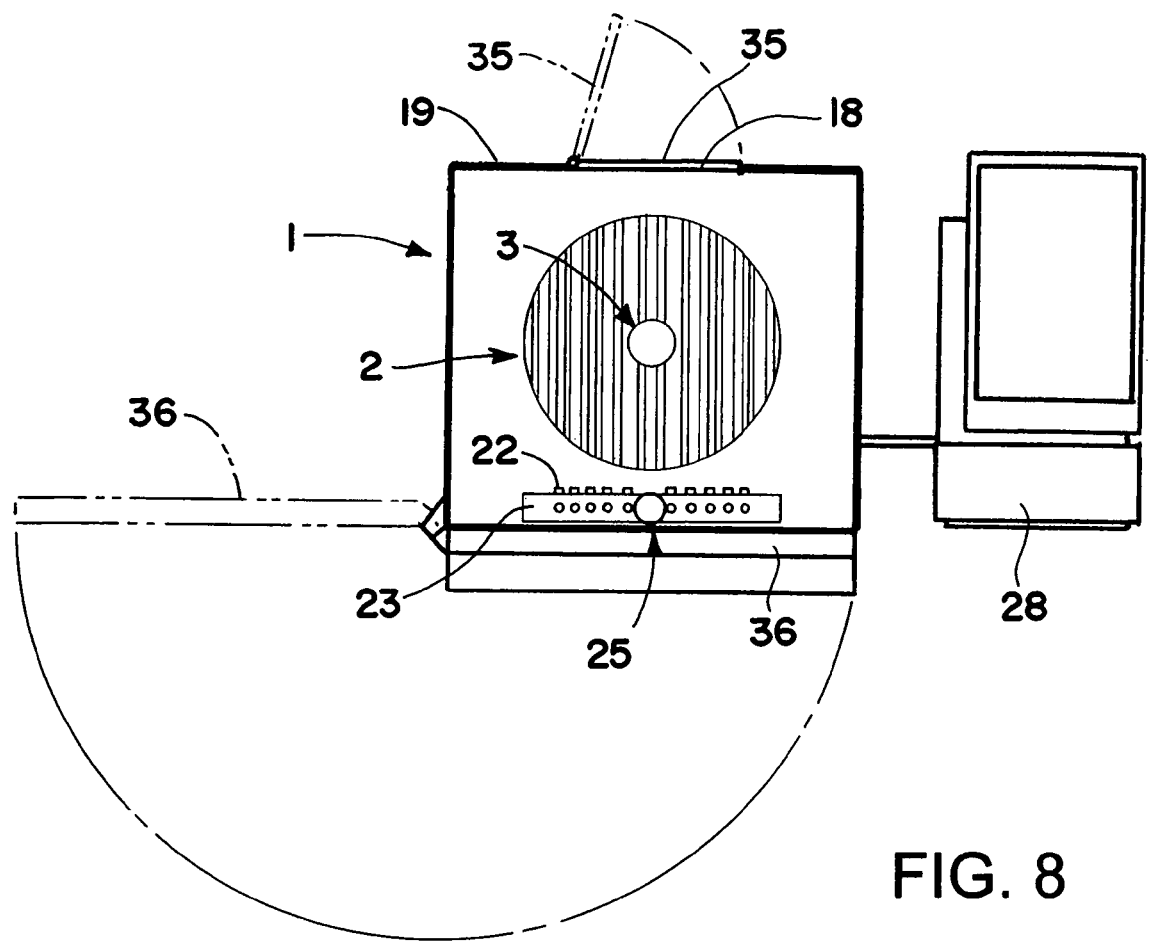
FIG. 8 is a schematic top plan view of the dross compression apparatus of FIG. 6.

Suitable slides or the like (not shown) may be provided on the air manifold 23 for engagement with vertical rails or the like on the frame of the dross compression apparatus for guiding the air manifold during its vertical movement. Also a suitable mechanism such as a piston/cylinder 25 that is used to move the air manifold 23 vertically may be controlled by the same controller 26 (see FIGS. 7 and 8) that is used to control the vertical movements of the compression head 2 for causing the air manifold and associated air nozzles 22 to move in unison with the compression head.

Suitable hoses 30 may connect the air nozzles 22 to the plenum chamber 31 of the air manifold 23 as schematically shown in FIG. 5. Air manifold 23 may be supplied with pressurized air through a hose 32 from a suitable air supply such as compressed air or air received from a blower at a remote site.

The number, size and location of the air vent slots 18 in wall 19 of dross compression apparatus 1 should be such that substantially all of the cooling air passing over the top of the compression head is discharged through the slots to minimize oxidation of the dross metal. Air vent slots 18 may all be of about the same length and may match the peaks 20 and valleys 21 formed by the ribs 10 on the top of compression head 2 in number and location. If the wall 19 of dross compression apparatus 1 in which the slots are provided contains a small door 35 used to provide access for cleaning the compression head, the slots 18 may also extend through portions of the door as schematically shown in FIG. 7 to aid in the venting of substantially all of the cooling air from the dross compression apparatus after passing over the top of the compression head.

In operation in accordance with the method of the present invention, dross is collected from an electric furnace or the like in the receptacle 5 of the dross collector 4 and then transported to the dross compression apparatus 1. With the lower receptacle or sow mold 6 in place, metal, particularly aluminum, is allowed to decant through an opening in the lower end of the dross collector 4 into the sow mold. Then, after the main door 36 (see FIG. 8) of the dross compression apparatus is closed, the compression head 2 is moved toward the dross collector receptacle 5 to compress the dross. At the same time, the ribs 11 and 12 on the bottom 16 and sides 17 of the compression head 2 form grooves in the shell of material between the compression head and the inner surface of the receptacle as disclosed in the aforementioned U.S. Pat. Nos. 5,397,104 and 5,669,957 enabling the shell to be easily broken for further processing such as by crushing.

The cooling air that is directed by the vortex nozzles 22 across the top of the compression head 2 during compression of the dross will lower the temperature of the compression head and maximize the cooling effect of the air on the compression head. Removing the heat from the compression head while the compression head is compressing the dross material during the recovery process increases the capacity of the dross compression apparatus without the need for water cooling. The cooling capacity of the compression head of the present invention may be as much as four times that of a standard compression head. For example, a dross compression apparatus incorporating the compression head cooling system of the present invention that normally presses three to four containers of dross metal every three to four hours would be able to press three to four containers of the dross metal every hour.

Although the invention has been shown and described with respect to certain embodiments, it is obvious that equivalent alterations and modifications will occur to others skilled in the art upon the reading and understanding of the specification. In particular, with regard to the various functions performed by the above described components, the terms (including any reference to a "means") used to describe such components are intended to correspond, unless otherwise indicated, to any component which performs the specified function of the described component (e.g., that is functionally equivalent), even though not structurally equivalent to the disclosed component which performs the function in the herein illustrated exemplary embodiments of the invention. Also, all of the disclosed functions may be computerized and automated as desired. In addition, while a particular feature of the invention may have been disclosed with respect to only one embodiment, such feature may be combined with one or more other features as may be desired and advantageous for any given or particular application.

What is claimed is:

1. A dross compression apparatus comprising:
a compression head;
means for directing cooling air across a top of the compression head for cooling the compression head;
one or more air vents in a wall of the apparatus through which the air is vented after passing across the top of the compression head; and
a plurality of ribs extending across the top of the compression head in the direction of the air vents in the wall of the apparatus for directing the air across the top of the compression head and out the air vents.

2. The apparatus of claim 1 wherein additional ribs are provided on a bottom and sides of the compression head.

3. The apparatus of claim 1 wherein the means for directing cooling air comprises one or more vortex nozzles.

4. The apparatus of claim 1 wherein the ribs have peaks and valleys, and the air vents in the wall of the apparatus substantially match the peaks and valleys in number and location.

5. A dross compression apparatus comprising a compression head, and means for directing cooling air across a top of the compression head for cooling the compression head, wherein the means for directing blows cooling air across the top of the compression head.

6. A dross compression apparatus comprising a compression head, and means for directing cooling air across a top of the compression head for cooling the compression head, wherein the compression head is vertically movable toward and away from a dross collector, and the means for directing cooling air across the top of the compression head is vertically movable in synchronism with the compression head.

7. The apparatus of claim 6 further comprising a plurality of vertical air vents in a wall of the apparatus through which the air is vented after passing across the top of the compression head.

8. The apparatus of claim 7 further comprising a plurality of ribs extending across the top of the compression head in the direction of the air vents in the wall of the apparatus for directing the air across the top of the compression head and out the air vents.

9. The apparatus of claim 8 wherein the ribs have peaks and valleys and the air vents in the wall of the apparatus substantially match the peaks and valleys in number and location.

10. A method of cooling a compression head of a dross compression apparatus comprising the steps of directing cooling air across the top of the compression head, and venting the air after passing across the top of the compression head out of the apparatus, wherein the air is blown across the top of the compression head.

11. A method of cooling a compression head of a dross compression apparatus comprising the steps of directing cooling air across the top of the compression head, and venting the air after passing across the top of the compression head out of the apparatus, wherein a plurality of ribs extend across the top of the compression head for directing the air across the top of the compression head and out through air vents in a wall of the apparatus.

12. The method of claim 11 further comprising the step of moving the compression head vertically toward and away from a dross collector while directing the cooling air across the top of the compression head.

13. The method of claim 12 wherein air nozzles are moved vertically in synchronism with the compression head for directing air along and between the ribs extending across the compression head during and between vertical movements of the compression head.

14. A dross compression apparatus comprising a compression head having a plurality of ribs on a top of the compression head, and means for directing cooling air across the top of the compression head and between the ribs for cooling the compression head.

15. The apparatus of claim 14 wherein additional ribs are provided on a bottom and sides of the compression head.

16. The apparatus of claim 14 wherein the means for directing cooling air comprises one or more vortex nozzles.

17. The apparatus of claim 14 wherein the means for directing blows cooling air across the top of the compression head.

18. The apparatus of claim 14 wherein the compression head is vertically movable toward and away from a dross collector, and the means for directing cooling air across the top of the compression head is vertically movable in synchronism with the compression head.

* * * * *